United States Patent
Nakao

(10) Patent No.: US 10,232,805 B2
(45) Date of Patent: Mar. 19, 2019

(54) VEHICLE

(71) Applicant: Toyota Jidosha Kabushiki Kaisha, Toyota-shi Aichi-ken (JP)

(72) Inventor: Hitoshi Nakao, Nisshin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/793,559

(22) Filed: Oct. 25, 2017

(65) Prior Publication Data

US 2018/0170286 A1    Jun. 21, 2018

(30) Foreign Application Priority Data

Dec. 19, 2016   (JP) .................. 2016-245815

(51) Int. Cl.
   *B60R 16/02*   (2006.01)
   *B60R 13/08*   (2006.01)

(52) U.S. Cl.
   CPC ...... *B60R 13/0869* (2013.01); *B60R 13/0876* (2013.01); *B60R 16/0215* (2013.01)

(58) Field of Classification Search
   CPC ............ B60R 13/0869; B60R 13/0876; B60R 16/0215
   USPC ....................................... 296/39.3
   See application file for complete search history.

(56) References Cited

U.S. PATENT DOCUMENTS

| | | | |
|---|---|---|---|
| 2006/0202499 A1* | 9/2006 | Blomeling | B60N 3/048 296/39.3 |
| 2006/0237216 A1* | 10/2006 | Yoshida | F16C 1/26 174/110 R |
| 2009/0050392 A1* | 2/2009 | Kakuta | B62M 7/02 180/219 |
| 2013/0057013 A1* | 3/2013 | Schaefer | B60R 13/08 296/39.3 |
| 2015/0252716 A1* | 9/2015 | Tanno | B60K 13/04 123/41.58 |
| 2016/0152196 A1* | 6/2016 | Inao | B60R 16/0215 174/72 A |
| 2016/0366796 A1* | 12/2016 | Wakabayashi | H05K 9/0098 |

FOREIGN PATENT DOCUMENTS

| | | |
|---|---|---|
| JP | H09177564 A | 7/1997 |
| JP | 2011-149338 | 8/2011 |
| JP | 2016-176423 A | 10/2016 |

* cited by examiner

*Primary Examiner* — Pinel E Romain
(74) *Attorney, Agent, or Firm* — Dinsmore & Shohl LLP

(57) ABSTRACT

A vehicle includes a heat insulator in a form of a plate, the heat insulator covering an exhaust component of an internal combustion engine; and a wire harness disposed on a side of the heat insulator. An end edge among end edges of the heat insulator has a shape that is protruding and recessed in a plate thickness direction in a side view of the end edge, the end edge being located on a side of the wire harness.

4 Claims, 5 Drawing Sheets

VEHICLE

CROSS-REFERENCE TO RELATED APPLICATIONS

The present application claims priority to Japanese Patent Application No. 2016-245815 filed on Dec. 19, 2016, which is incorporated herein by reference in its entirety including the specification, drawings and abstract.

BACKGROUND

1. Technical Field

The disclosure relates to a vehicle.

2. Description of Related Art

Japanese Patent Application Publication No. 2011-149338 (JP 2011-149338 A) discloses a heat insulator provided in a vehicle. The heat insulator is formed of a metal plat(c) material. The heat insulator has a three-dimensional shape that conforms to the external shape of an exhaust manifold of an internal combustion engine. The heat insulator is disposed to cover the exhaust manifold. The heat insulator reduces the possibility that heat released from the exhaust manifold is transferred to other components that are disposed around the internal combustion engine.

SUMMARY

In a vehicle, a wire harness is routed and disposed around an internal combustion engine, in other words, around a heat insulator. Through the wire harness, various electric signals that are output from the internal combustion engine are transmitted to a control device of the vehicle, for example.

In the case where a considerable force acts around the internal combustion engine during a vehicle collision or the like, the relative positions of the heat insulator and the wire harness may be changed and they may interfere with each other. As a result, the wire harness may be damaged. As described above, when the heat insulator interferes with other components that are disposed around the heat insulator, the other components may be damaged. However, there is no disclosure about such points in JP 2011-149338 A, and vehicles including a heat insulator still have room for improvement.

An aspect of the disclosure relates to a vehicle including a heat insulator in a form of a plate, the heat insulator covering an exhaust component of an internal combustion engine; and a wire harness disposed on a side of the heat insulator. An end edge among end edges of the heat insulator has a shape that is protruding, and recessed in a plate thickness direction in a side view of the end edge, the end edge being located on a side of the wire harness.

The inventor investigated, in a vehicle in which a wire harness is located on a side of a heat insulator, the state of the wire harness in the case in which a considerable force acted around an internal combustion engine daring a vehicle collision or the like, and found that damage to the wire harness was caused by sliding movement of an end edge of the heat insulator. In the above configuration, the end edge among the end edges of the heat insulator has the shape that is protruding and recessed in the plate thickness direction in the side view of the end edge, the end edge being located on the side of the wire harness. Thus, when the wire harness interferes with the end edge of the heat insulator, the position where the end edge slides changes in the plate thickness direction. As a result, as compared to a configuration in which the end edge is formed to be linear (straight) in a side view thereof, the sliding position can be dispersed and the sliding distance (the distance by which the end edge slides) in one place on the wire harness can be shortened. Thus, with the above configuration, it is possible to suppress damage to the wire harness caused by sliding movement of the end edge of the heat insulator.

In the vehicle according to the above aspect, the wire harness may include an assemblage in which a plurality of electric cables is bundled and an accommodating tube in which the assemblage extends; the accommodating tube may have a bellows shape in which small-diameter portions and large-diameter portions are alternately arranged; and in the end edge of the heat insulator, the end edge being located on the side of the wire harness, a distance in the plate thickness direction between an outer end race of a recessed portion of the end edge in the plate thickness direction and a distal end face of a protruding portion of the end edge in a direction in which the protruding portion protrudes may be longer than a length between the large-diameter portions adjacent to each other in the accommodating tube.

In the above configuration, in the end edge of the heat insulator, the distance in the plate thickness direction between the outer end face of the recessed portion of the end edge and the distal end face of the protruding portion of the end edge is longer than the length between the large-diameter portions adjacent to each other in the accommodating tube. In other words, the height of the protruding and recessed portions in the end edge of the heat insulator is longer than the length of each of the small-diameter portions in an axial direction of the accommodating tube. Thus, when the end edge of the heat insulator slides on the small-diameter portion of the accommodating tube and their relative positions are changed, the protruding portion of the end edge of the heat insulator contacts (engages with) the large-diameter portion of the accommodating tube. Accordingly, the contact area Between the heat insulator arid the accommodating tube increases and the sliding movement thereof is suppressed. Thus, it is possible to further suppress damage to the accommodating tube of the wire harness.

In the vehicle according to the above aspect, the wire harness may include an assemblage in which a plurality of electric cables is bundled and an accommodating tube in which the assemblage extends; the accommodating tube may have a bellows shape in which small-diameter portions and large-diameter portions are alternately arranged; and in the end edge of the heat insulator, the end edge being located on the side of the wire harness, a length, in a direction perpendicular to the plate thickness direction of an outer end face of a recessed portion of the end edge in the plate .thickness direction and a length, in the direction perpendicular to the plate thickness direction, of a distal end face of a protruding portion of the end edge in a direction m which the protruding portion protrudes may be shorter than a diameter of each of the small-diameter portions of the accommodating tube in the side view.

In the end edge of the heat insulator, a connecting face that connects the outer end face of the recessed portion with the distal end face of the protruding portion extends in the plate thickness direction. In the above configuration, the length, in the direction perpendicular to the plate thickness direction, of the outer end face of the recessed portion and the length, in the direction perpendicular to the plate thickness direction, of the distal end face of the protruding portion is shorter than the diameter of each of the small-diameter portions of the accommodating tube in the side view. Therefore, an interval between the pro trading and recessed portions in the end edge of the heat insulator is short, and thus, the connecting face that connects, the outer end face with the distal end face contacts the accommodating tube when the small-diameter portion or the large-diameter portion of the accommodating tube contacts the end edge of the heat insulator. Because the connecting face extends in the plate thickness direction, the area of contact between the accommodating tube and the heat insulator at a given moment can be widened in the axial direction of the accommodating tube. Thus, when the end edge of the heat insulator slides on the accommodating tube, a load applied to the accommodating tube can be dispersed in the axial direction. Accordingly, as compared to the case where a load is locally concentrated, damage to the accommodating tube can be suppressed.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
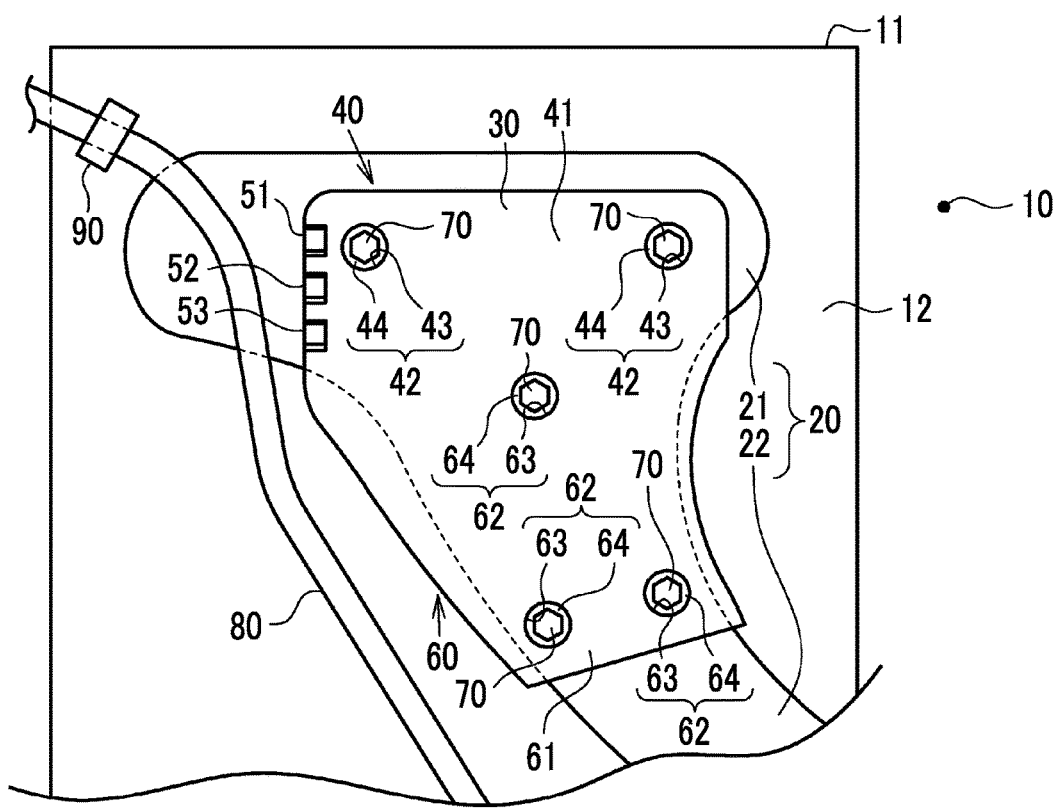
FIG. 1 is a front view that illustrates the configuration of a vehicle in a first embodiment.

A first embodiment of a vehicle is described with reference to FIG. 1 to FIG. 4. As shown in FIG. 1, an internal combustion engine 11 is mounted in an engine compartment 10 of the vehicle. An exhaust manifold 20 as an exhaust component is connected to a cylinder head 12 of the internal combustion engine 11. Exhaust gas that is discharged from combustion chambers of the internal combustion engine 11 is introduced into the exhaust manifold 20 through exhaust ports (not shown) that are formed in the cylinder head 12. The exhaust manifold 20 includes a branch pipe portion 21 on the exhaust upstream side and a junction pipe portion 22 that is connected to the exhaust downstream side of the branch pipe portion 21. The branch pipe portion 21 is branched at an upstream end, and each of the branched ends is connected to a corresponding one of the exhaust ports. A heat insulator 30 is connected to the exhaust manifold 20.

The heat insulator 30 is formed of a metal plate material, and has a three-dimensional shape that conforms to the external shape of the exhaust manifold 20. The heat insulator 30 includes an upper coyer portion 40 that covers the branch pipe portion 21 of the exhaust manifold 20, and a lower cover portion 60 that covers the junction pipe portion 22 of the exhaust manifold 20. The upper cover portion 40 includes an upper facing wall 41 that is located spaced apart from the exhaust manifold 20, and upper recessed portions 42 that extend toward the exhaust manifold 20 from the upper facing wall 41. Each upper recessed portion 42 includes a sidewall 43 that has a cylindrical shape and extends from the upper facing wall 41, and a circular lid wall 44 that is connected to a distal end of the sidewall 43 in an extending direction thereof. The lid wall 44 is in contact with the branch pipe portion 21 oi the exhaust manifold 20, and has an upper bolt insertion hole at its center. The branch pipe portion 21 of the exhaust manifold 20 has bolt holes at positions corresponding to the upper bolt insertion holes. The upper recessed portions 42 are located at opposite ends of an exhaust upstream end portion (upper end portion in FIG. 1) in the upper cover portion 40.

The lower cover portion 60 includes a lower facing wall 61 that is located spaced apart from the exhaust manifold 20, and lower recessed portions 62 that extend toward the exhaust manifold 20 from the lower facing wall 61. Each lower recessed portion 62 includes a sidewall 63 that has a cylindrical shape and extends from the lower facing wall 61, and a circular lid wall 64 that is connected to a distal end of the sidewall 63 in an extending direction thereof. The lid wall 64 is in contact with the junction pipe portion 22 of the exhaust manifold 20, and has a lower bolt insertion hole at its center. The junction pipe portion 22 of the exhaust manifold 20 has bolt holes at positions corresponding to the lower bolt insertion holes. The lower recessed portions 62 are located at a center of an exhaust upstream end portion (upper end portion in FIG. 1) and opposite ends of an exhaust downstream end portion (lower end portion in FIG. 1) in the lower cover portion 60. Bolts 70 are inserted through the upper bolt insertion holes and the lower bolt insertion holes, and are screwed into the bolt holes of the exhaust manifold 20. Thus, the heat insulator 30 is connected to the exhaust manifold 20.

Figure 2:
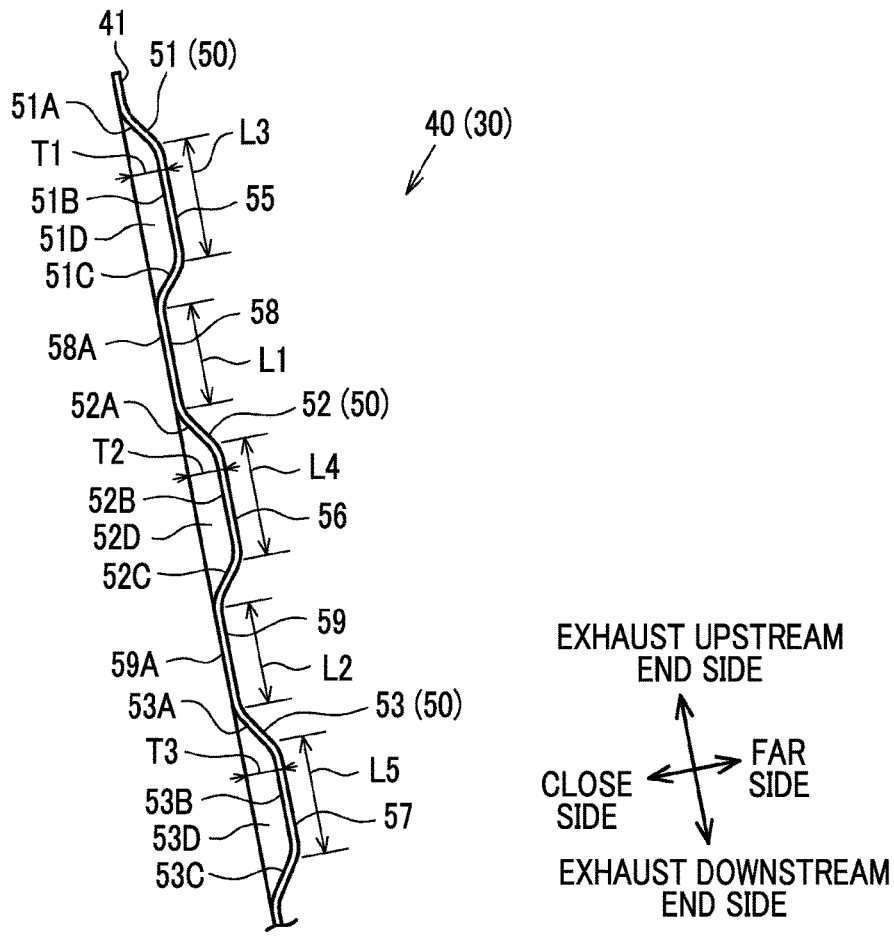
FIG. 2 is a side view that illustrates the shape of an end edge of a heat insulator as seen from the side thereof.

As shown in FIG. 2, the upper cover portion 40 of the heat insulator 30 is inclined, with respect to a vertical direction, toward a close side (left side in FIG. 2) close to the exhaust manifold 20 (i.e., the upper cover portion 40 is inclined, with respect to the vertical direction, toward the exhaust manifold 20) in a direction toward an exhaust upstream end (upper end in FIG. 2) of the upper cover portion 40 in a left side view that illustrates a left end edge of the upper cover portion 40 as seen from the left side of the left end edge. As shown in FIG. 1 and FIG. 2, a plurality of protruding portions 50 is formed in a left end portion of the upper cover portion 40. Each of the protruding portions 50 protrudes toward a far side (right side in FIG. 2) far from the exhaust manifold 20. Three protruding portions 50 are arranged along an end edge of the left end portion. Each protruding portion 50 extends to the end edge of the left end portion. In the following, the protruding portions 50 are referred to as a first protruding portion 51, a second protruding portion 52, and a third protruding portion 53 from the exhaust upstream end side (that is, the first protruding portion 51, the second protruding portion 52, and the third protruding portion 53 are arranged in the stated order from the exhaust upstream end side).

As shown in FIG. 2, the first protruding portion 51 includes an 11th inclined wall 51A. The 11th inclined wall 51A is connected to the upper facing wall 41. and is inclined toward the far side far from the exhaust manifold 20 in a direction toward an exhaust downstream end (lower end in FIG. 2) thereof. A first distal end wall 51B that extends in parallel with the upper facing wall 41 is connected to an exhaust downstream end portion of the 11th inclined wall 51A. A 12th inclined wall 51C is connected to an exhaust downstream end portion of the first distal end wall 51B. The 12th inclined wall 51C is inclined toward the close side close to the exhaust manifold 20 (i.e., the 12th inclined wall 51C is inclined toward the exhaust manifold 20) in a direction toward an exhaust downstream end thereof. The 11th inclined wall 51A, the first distal end wall 51B, and the 12th inclined wall 51C are connected at their right end portions (end portions on the back side of paper of FIG. 2) by a first right wall 51D that extends in the plate thickness direction of the upper facing wall 41.

The second protruding portion 52 includes a 21st inclined wall 52A. The 21st inclined wall 52A is connected to the upper facing wall 41, and is inclined toward the far side in a direction toward an exhaust downstream end thereof. A second distal end wall 52B that extends in parallel with the upper facing wall 41 is connected to an exhaust downstream end portion of the 21st inclined wall 52A. A 22nd inclined wall 52C is connected to an exhaust downstream end portion of the second distal end wall 52B. The 22nd inclined wall 52C is inclined toward the close side in a direction toward an exhaust downstream end thereof. The 21st inclined wall 52A, the second distal end wall 52B, and the 22nd inclined wall 52C are connected at their right end portions by a second right wall 52D that extends in the plate thickness direction of the upper facing wall 41.

The third protruding portion 53 includes a 31st inclined wall 53A. The 31st inclined wall 53A is connected to the upper facing wall 41, and is inclined toward the far side in a direction toward an exhaust downstream end thereof. A third distal end wall 53B that extends in parallel with the upper facing wall 41 is connected to an exhaust downstream end portion of the 31st inclined wall 53A. A 32nd inclined wall 53C is connected to an exhaust downstream end portion of the third distal end wall 53B. The 32nd inclined wall 53C is inclined toward the close side in a direction toward an exhaust downstream end thereof. The 31st inclined wall 53A, the third distal end wall 53B, and the 32nd inclined wall 53C are connected at their right end portions by a thud right wall 53D that extends in the plate thickness direction of the upper facing wall 41.

Between the first protruding portion 51 and the second protruding portion 52, a first recessed portion 58 that is recessed toward the close side is formed by the 12th inclined wall 51C of the first protruding portion 51, the upper lacing wall 41 and the 21st inclined wall 52A of the second protruding portion 52. Between the second protruding portion 52 and the third protruding portion 53, a second recessed portion 59 that is recessed toward the close side is formed by the 22nd inclined wall 52C of the second protruding portion 52, the upper facing wall 41 and the 31st inclined wall 53A of the third protruding portion 53. In other words, a left end edge of the upper cover portion 40 of the heat insulator 30 has a shape that is protruding and recessed in the plate thickness direction of the upper facing wall 41 due to the pro trading portions 50.

In the first protruding portion 51, an end face of the first distal end wall 51B on the tar side forms a distal end face 55 of the first protruding portion 51. In the first recessed portion 58, an end face of the upper facing wall 41 on the close side forms an outer end face 58A of the first recessed portion 58 in the plate thickness direction. In the second protruding portion 52, an end face of the second distal end wall 52B on the far side forms a distal end face 56 of the second protruding portion 52. In second recessed portion 59, an end face of the upper facing wall 41 on the close side forms an outer end face 59A of the second recessed portion 59 in the plate thickness direction. In the third protruding portion 53, an end face of the third distal end wall 53B on the far side forms a distal end face 57 of the third protruding portion 53. The first protruding portion 51, the second protruding portion 52, and the third protruding portion 53 have the same shape. In other words, a distance T1 in the plate thickness direction between the distal end face 55 of the first protruding portion 51 and the outer end face 58A of the first recessed portion 58 is equal to a distance T2 in the plate thickness direction between the distal end face 56 of the second protruding portion 52 and the outer end face 59A of the second recessed portion 59. The distance T1 in the first protruding portion 51 is equal to a distance T3 in the plats thickness direction between the distal end face 57 of the third protruding portion 53 and the outer end face 59A of the second recessed portion 59 (T1=T2=T3). The distance T1 (=T2, T3) is set to 4 mm, for example.

In the left side view in FIG. 2, a distance in a perpendicular direction that is perpendicular to the plate thickness direction (the direction in which the upper facing wall 41 extends in FIG. 2) between the first protruding portion 51 and the second protruding portion 52 is equal to a distance in the perpendicular direction between the second protruding portion 52 and the third protruding portion 53. In other words, a length L1, in the perpendicular direction, of the outer end face 58A of the first recessed portion 58 is equal to a length L2, in the perpendicular direction, of the outer end face 59A of the second recessed portion 59 (L1=L2). Thus, the first recessed portion 58 and the second recessed portion 59 have the same shape. A length L3, in the perpendicular direction, of the distal end face 55 of the first protruding portion 51, a length L4, in the perpendicular direction, of the distal end face 56 of the second protruding portion 52, and a length L5, in the perpendicular direction, of the distal end face 57 of the third protruding portion 53 are equal to each other, and are longer than the length L1 (=L2) of the outer end face 58A of the first recessed portion 58.

As shown in FIG. 1, the vehicle also includes a wire harness 80 that is disposed around the internal combustion engine 11. The wire harness 80 passes behind the branch pipe portion 21 of the exhaust manifold 20 and is routed along a left side of the heat insulator 30. A lower end portion of the wire harness 80 is disposed in a curved shape along the junction pipe portion 22. An upper end portion of the wire harness 80, which is located above the branch pipe portion 21, is supported by a clamp 90 connected to the upper end portion, and is located in the vicinity of the cylinder head 12. The lower end portion of the wire harness 80, which is disposed along the junction pipe portion 22, extends to ward the front side of paper of FIG. 1. Thus, the wire harness 80 is routed such that an intermediate portion thereof between the upper end portion thereof and the lower end portion thereof extends to cross the end edge of the left end portion of the heat insulator 39 in the side view. In other words, in the heat insulator 30, the end edge of the left end portion corresponds to an end edge that is located on the side of the wire harness 80. Because the protruding portions 50 are formed in the end edge that is located on the side of the wire harness 80, the end edge has a shape that is protruding and recessed in the plate thickness direction in the side view.

Figure 3:
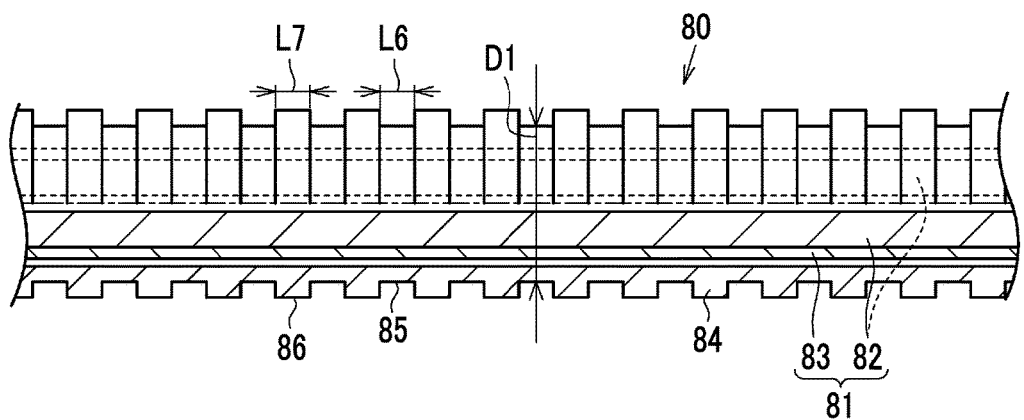
FIG. 3 is a partial sectional view that illustrates the structure of a wire harness.

As shown in FIG. 3, the wire harness 80 includes an assemblage 81 in which a plurality of electric cables 82 is bundled. In this embodiment, the assemblage 81 includes two electric cables 82, and a cover tape 83 that is used to bundle the electric cables 82. Each electric cable 82 is coated with an insulation film. Connectors (not shown) are connected to opposite ends of the assemblage 81. For example, the wire harness 80 is connected to the internal combustion engine 11 at one end and to a control device of the vehicle at the other end via the connectors to transmit various electric signals that are output from the internal combustion engine 11 to the control device of the vehicle, The wire harness 80 also includes an accommodating tube 84 in which the assemblage 81 extends. The accommodating tube 84 has a bellows shape in which small-diameter portions 85 and large-diameter portions 86 are alternately arranged in an axial direction thereof (lateral direction (right-left direction) in FIG. 3). The accommodating tube 84 has an inside diameter which is constant in the axial direction. A length L6 of each small-diameter portion 85 of the accommodating tube 84 in the axial direction is equal to a length L7 of each large-diameter portion 86 of the accommodating tube 84 in the axial direction (L6=L7). The length L6 (=L7) of the small-diameter portion 85 is set to 2 mm, for example. Thus, the distance T1 (=T2, T3) in the plate thickness direction between the outer end face 58A of the first recessed portion 58 and the distal end face 55 of the first protruding portion 51 in the end edge of the heat insulator 30 is longer than the length L6 (=L7) of the small-diameter portion 85. Accordingly, the distance T1 is longer than the length between the large-diameter portions 86 adjacent to each other in the accommodating tube 84. In addition, a diameter D1 of each small-diameter portion 85 of the accommodating tribe 84 is set to 24 mm, for example. In the heat insulator 30, the length L3 (=L4, L5) of the distal end face 55 of the first protruding portion 51 and the length L1 (=L2) of the outer end face 58A of the first recessed portion 58 are both longer than the diameter D1 of the small-diameter portion 85 of the accommodating tube 84.

Figure 4:
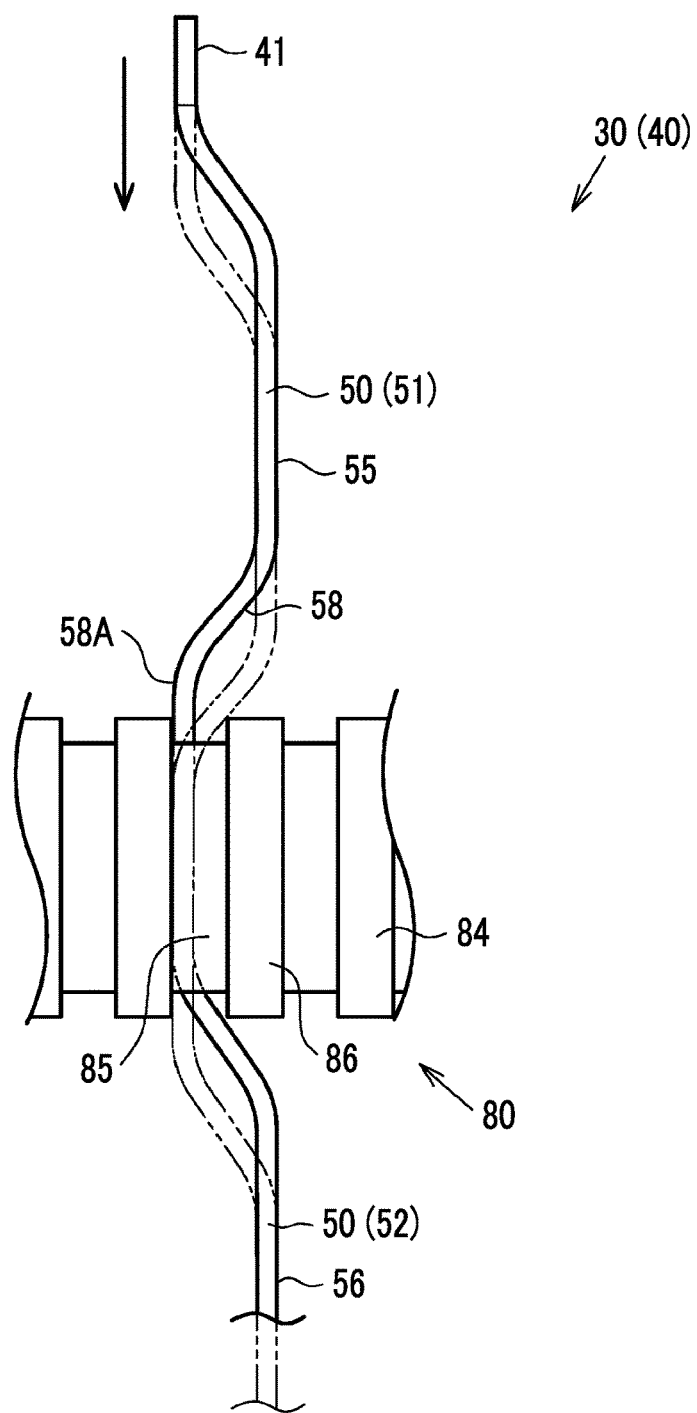
FIG. 4 is a side view that illustrates a manner in which the heat insulator slides on the wire harness.

Effects of this embodiment are described with reference to FIG. 4. (1) As shown in FIG. 4, in this embodiment, the end edge among the end edges of the heat insulator 30 has a shape that is protruding and recessed in the plate thickness direction (right-left direction in FIG. 4) in the left side view of the end edge, the end edge being located on the side of the wire harness 80. Thus, when the wire harness 80 interferes with the end edge of the heat insulator 30 and the end edge of the heat insulator 30 slides on the small-diameter portion 85 of the wire harness 80 in a direction indicated by an arrow in FIG. 4 while being in contact with the small-diameter portion 85, the position where the end edge slides on the small-diameter portion 85 changes in the plate thickness direction. As a result, as compared to a configuration in which the end edge is formed to be linear (straight) in the side view thereof, the sliding position can be dispersed, and the sliding distance (i.e., the distance by which the end edge slides) in one place on the wire harness 80 can be shortened. Thus, it is possible to suppress damage to the wire harness 80 caused by sliding movement of the end edge of the heat insulator 30.

(2) The accommodating tube 84 has a bellows shape in which the small-diameter portions 85 and the large-diameter portions 86 are alternately arranged. In the end edge of the heat insulator 30 that is located on the side of the wire harness 80, the distances T1, T2 and T3 in the plate thickness direction between the outer end feces 58A and 59A of the recessed portions 58 and 59 and the distal end faces 55, 56 and 57 of the protruding portions 50 are longer than the length L6 between the large-diameter portions 86 adjacent to each other m the accommodating tube 84. In other words, each of the distances T1, T2 and T3, i.e., the height of the protruding and recessed portions in the end edge of the heat insulator 30 is longer than the length L6 of the small-diameter portion 85 in the axial direction of the accommodating tube 84. Thus, when the end edge of the heat insulator 30 slides on the small-diameter portion 85 of the accommodating tube 84 and their relative positions are changed, the large-diameter portion 86 of the accommodating tube 84 contacts (engages with) the protruding portion 50 of the end edge of the heal insulator 30 as indicated by alternate long and two short dashes lines in FIG. 4. Thus, the contact area between the accommodating tube 84 and the end edge of the heat insulator 30 increases and sliding movement thereof is suppressed. As a result, the area in which a load is applied on the accommodating tube 84 can be dispersed in the axial direction, and the sliding distance (the distance by which the end edge slides) in one place on the wire harness 80 can be shortened. Thus, it is possible to further suppress damage to the accommodating tube 84 of the wire harness 80.

(3) The length L3 of the distal end face 55 of the first protruding portion 51, the length L4 of the distal end face 56 of the second protruding portion 52, the length L5 of the distal end face 57 of the third protruding portion 53, the length L1 of the outer end face 58A of the first recessed portion 58, and the length L2 of the outer end face 59A of the second recessed portion 59 in the heat insulator 30 are longer than the diameter D1 of the small-diameter portion 85 of the accommodating tube 84. Thus, when a considerable force acts around the internal combustion engine 11 and the wire harness 80 interferes with the protruding and recessed portions of the end edge of the heat insulator 30, the small-diameter portion 85 of the accommodating tube 84 contacts the protruding portion 50 or the recessed portion 58 or 59. Thus, when the end edge of the heat insulator 30 slides on the small-diameter portion 85 of the accommodating tube 84 as shown in FIG. 4, the large-diameter portion 86 of the accommodating tube 84 contacts (engages with) the protruding portion 50 of the end edge of the heat insulator 30, and the sliding movement thereof is suppressed. Thus, it is possible to further shorten the sliding distance (the distance by which the end edge slides) on the wire harness 80 when the wire harness 80 interferes with the end edge of the heat insulator 30, the end edge being located on the side of the wire harness 80.

A second embodiment of the vehicle is described with reference to FIG. 5 and FIG. 6. In this embodiment, the left end portion of the heat insulator 30 has a shape different from that of the first embodiment. In the following, configurations different from those of the first embodiment are described and detailed description of configurations similar to those of the first embodiment is omitted.

Figure 5:
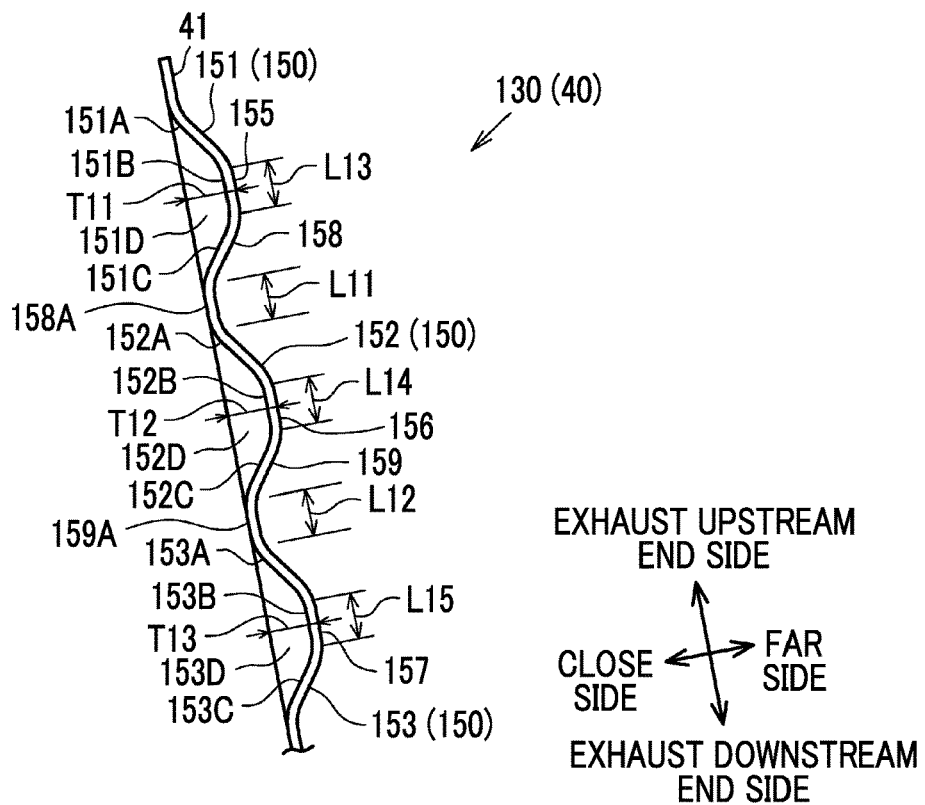
FIG. 5 is a side view that illustrates the shape of an end edge of a heat insulator that is provided in a vehicle in a second embodiment, as seen from the side of the end edge of the heat insulator.

As shown in FIG. 5, a plurality of protruding portions 150 is formed in a left end portion of an upper cover portion 40 of a heat insulator 130. Each of the protruding portions 150 protrudes toward a far side (right side in FIG. 5) far from the exhaust manifold 20. Three protruding portions 150 are-arranged along an end edge of the left end portion. Each protruding portion 150 extends to the end edge of the left end portion. The end edge of the left end portion among the end edges of the heat insulator 130 has a shape that is protruding and recessed in the plate thickness direction in the side view of the end edge, due to the protruding portions 150, the end edge of the left end portion being located on the side of the wire harness 80. In the following, the protruding portions 150 are referred to as an 11th protruding portion 151, a 12th protruding portion 152, and a 13th protruding portion 153 from the exhaust upstream end side (i.e., the 11th protruding portion 151, the 12th protruding portion 152, and the 13th protruding portion 153 are arranged in the stated order front the exhaust upstream end side).

As shown in FIG. 5, the 11th protruding portion 151 includes a 111th inclined wall 151A. The 111th inclined wall 151A is connected to the upper facing wall 41, and is inclined toward the far side far from the exhaust manifold 20 in a direction, toward an exhaust downstream end (lower end in FIG. 5) thereof. An 11th distal end wall 151B that extends in parallel with the upper facing wall 41 is connected to an exhaust downstream end portion of the 111th inclined wall 151A. A 112th inclined wall 151C is connected to an exhaust downstream end portion of the 11th distal end wall 151B. The 112th inclined wall 151C is inclined toward the close side close to the exhaust manifold 20, in a direction toward an exhaust downstream end thereof. The 11th inclined wall 151A, the 11th distal end wall 151B, and the 112th inclined wall 151C are connected at their right end portions (end portions on the back side of paper of FIG. 5) by an 11th right wall 151D that extends in the plate thickness direction of the upper facing wall 41.

The 12th protruding portion 152 includes a 121st inclined wall 152A. The 121st inclined wall 152A is connected to the upper facing wall 41, and is inclined toward the far side in a direction toward an exhaust downstream end thereof. A 12th distal end wall 152B that extends in parallel with the upper facing wall 41 is connected to an exhaust downstream end portion of the 121st inclined wall 152A. A 122nd inclined wall 152C is connected to an exhaust downstream end portion of the 12th distal end wall 152B. The 122nd inclined wall 152C is inclined toward the close side in a direction toward an exhaust downstream end thereof. The 121st inclined wall 152A, the 12th distal end wall 152B, and the 122nd inclined wall 152C are connected at their right end portions by a 12th right wall 152D that extends in the plate thickness direction of the upper facing wall 41.

The 13th protruding portion 153 includes a 131st inclined wall 153A. The 131st inclined wall 153A is connected to the upper facing wall 41, and is inclined toward the far side in a direction toward an exhaust downstream end thereof. A 13th distal end wall 153B that extends in parallel with the upper facing wall 41 is connected to an exhaust downstream end portion of the 131st inclined wall 153A. A 132nd inclined wall 153C is connected to an exhaust downstream end portion of the 13th distal end wall 153B. The 132nd inclined wall 153C is inclined toward the close side in a direction toward an exhaust downstream end thereof. The 131st inclined wall 153A, the 13th distal end wall 153B, and the 132nd inclined wall 153C are connected at their right end portions by a 13th right wall 153D that extends in the plate thickness direction of the upper facing wall 41.

Between the 11th protruding portion 151 and the 12th protruding portion 152, an 11th recessed portion 158 that is recessed toward the close side is formed by the 132th inclined wall 151C of the 11th protruding portion 151, the upper facing wall 41, and the 121st inclined wall 152A of the 12th protruding portion 152. Between the 12th protruding portion 152 and the 13th protruding portion 153, a 12th recessed portion 159 that is recessed toward the close side is formed by the 122nd inclined wall 152C of the 12th protruding portion 152, the upper facing wall 41 and the 131st inclined wall 153A of the 13th protruding portion 153. In other words, the left end edge of the upper cover portion 40 of the heat insulator 130 has a shape that is protruding and recessed in the plate thickness direction of the upper facing wall 41, due to the protruding portions 150.

In the 11th protruding portion 151, an end face of the 11th distal end wall 152B on the far side forms a distal end face 155 of the 11th protruding portion 151. In the 11th recessed portion 158, an end face of the upper facing wall 41 on the close side forms an outer end face 158A of the 11th recessed portion 158 in the plate thickness direction. The 112th inclined wall 151C of the 11th protruding portion 151 extends in the plate thickness direction, of the upper facing wall 41, and forms a connecting face that connects the distal end face 155 of the 11th protruding portion 151 and the outer end face 158A of the 11th recessed portion 158.

In the 12th protruding portion 152, an end face of the 12th distal end wall 152B on the far side forms a distal end face 156 of the 12th protruding portion 152. In the 12th recessed portion 159, an end face of the upper facing wall 41 on the close side forms an outer end face 159A of the 12th recessed portion 159 in the plate thickness direction. In other words, the 121st inclined wall 152A of the 12th protruding portion 152 extends in the plate thickness direction of the upper facing wall 41, and forms a connecting face that connects the distal end face 156 of the 12th protruding portion 152 and the outer end face 158A of the 11th recessed portion 158. The 122nd inclined wall 152C of the 12th protruding portion 152 extends in the plate thickness direction of the upper facing wall 41, and forms a connecting face that connects the distal end face 156 of the 12th protruding portion 152 and the outer end face 159A of the 12th recessed portion 159.

In the 13forms a distal end face 157 of the 13th protruding portion 153. In other words, the 131st inclined wall 153A of the 13th protruding portion 153 extends in the plate thickness, direction of the upper facing wall 41, and forms a connecting face that connects the distal end face 157 of the 13th protruding portion 153 and the outer end face 159A of the 12th recessed portion 159.

The 11th protruding portion 151, the 12th protruding portion 152, and the 13th protruding portion 153 have the same shape. In other words, a distance T11 in the plate thickness direction between the distal end face 155 of the 11th protruding portion 151 and the outer end face 158A of the 11th recessed portion 158 is equal to a distance T12 in the plate thickness direction between the distal end face 156 of the 12th protruding portion 152 and the outer end face 159A of the 12th recessed portion 159. The distance T11 in the 11th protruding portion 151 is equal to a distance T13 in the plate thickness direction between the distal end face 157 of the 13th protruding portion 153 and the outer end face 159A of the 12th recessed portion 159 (T11=T12=T13). The distance T11 (=T12, T13) is set to 4 mm, for example. Thus, the distance T11 (=T12, T13) in the end edge of the heat insulator 130 is longer than the length L6 (=L7) of the small-diameter portion 85 of the accommodating tube 84 of the wire harness 80. That is, the distance T11 is longer than the length between the large-diameter portions 86 adjacent to each other in the accommodating tube 84.

In the left side view in FIG 5, a distance in a perpendicular direction that is perpendicular to the plate thickness direction (the direction in which the upper lacing wall 41 extends in FIG. 5) between the 11th protruding portion 151 and the 12th protruding portion 152 is equal to a distance in the perpendicular direction between the 12th protruding portion 152 and the 13th protruding portion 153. In other words, a length L11, in the perpendicular direction, of the outer end face 158A of the 11th recessed portion 158 is equal to a length L12, in the perpendicular direction, of the outer end face 159A of the 12th recessed portion 159 (L11=L12). Thus, the 11th recessed portion 158 and the 12th recessed portion 159 have the same shape. A length L13, in the perpendicular direction, of the distal end face 155 of the 11th protruding portion 151, a length L14, in the perpendicular direction, of the distal end face 156 of the 12th protruding portion 152, and a length L15, in the perpendicular direction, of the distal end face 157 of the 13th protruding portion 153 are equal to each other, and are equal to the length L11 (=L12) of the outer end face 158A of the 11th recessed portion 158.

The length L13 in the 11th protruding portion 151, the length L14 in the 12th protruding portion 152, the length L15 in the 13th protruding portion 153, the length L11 in the 11th recessed portion 158, and the length L12 in the 12th recessed portion 159 are shorter than the diameter D1 of the small-diameter portion 85 of the accommodating tube 84 of the wire harness 80. That is, in the end edge of the heat insulator 130, the lengths L13, L14, and L15 in the perpendicular direction in the protruding portions 150 of the end edge and the length in the perpendicular direction between the adjacent protruding portions 150 (=L11, L12) are shorter than the diameter D1 of the small-diameter portion 85 of the accommodating tube 84 in the left side view.

According to the second embodiment, the following effects can be obtained in addition to the effect as described in above (1). (4) In the end edge of the heat insulator, the end edge being is located on the side of the wire harness 80, the inclined walls 151C, 152A, 152C, and 153A as the connecting feces that connect the outer end faces 158A and 159A of the recessed portions 158 and 159 with the distal end faces 155, 156, and 157 of the protruding, portions 150 extend in the plate thickness direction. In this embodiment, the lengths L11 and L12, in the perpendicular direction, of the outer end faces 158A and 159A of the recessed portions 158 and 159, and the lengths L13, L14, and L15, in the direction perpendicular to the plate thickness direction, of the distal end faces 155, 156, and 157 of the protruding portions 150 are shorter than the diameter D1 of the small-diameter portion 85 of the accommodating tube 84.

Figure 6:
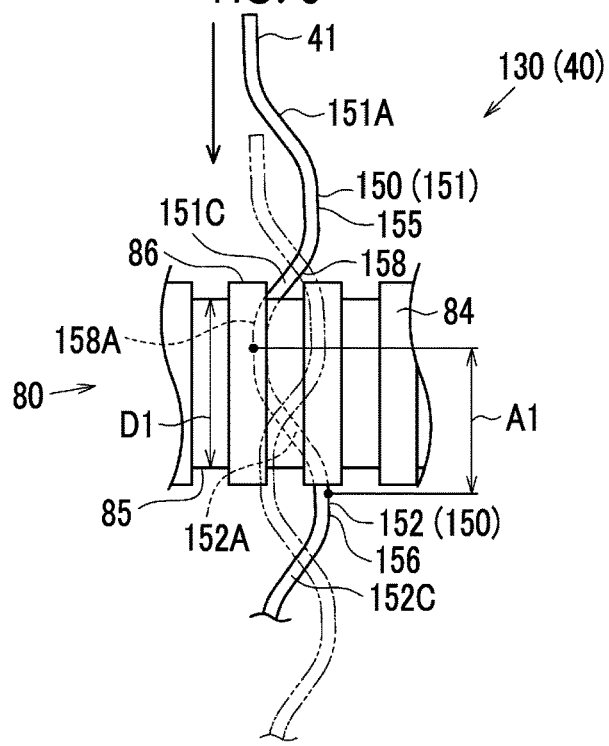
FIG. 6 is a side view that illustrates a manner in which the heat insulator slides on the wire harness in the second embodiment.

As shown in FIG. 6, in the end edge of the heat insulator 130, an interval A1 between the protruding and recessed portions, i.e., a distance from the center of the distal end face 155, 156, or 157 of the protruding portion 150 to the center of the adjacent outer end face 158A or 159A of the recessed portion 158 or 159 is shorter than the diameter D1 of the small-diameter portion 85. Thus, when the left end edge of the heat insulator 130 contacts the small-diameter portion 85 or the large-diameter portion 86 of the accommodating tube 84, at least one of the inclined walls 151C, 152A, 152C, and 153A, which connect the outer end faces 158A and 159A with the distal end feces 155, 156, and 157, contacts the accommodating tube 84. Because the inclined walls 151C, 152A, 152C, and 153A extend in the plate thickness direction, the area of contact between the accommodating tube 84 and the heat insulator 130 at a given moment is widened in the axial direction of the accommodating tube 84 (right-left direction in FIG. 6). Thus, as indicated by alternate, long and two short dashes lines in FIG. 6, when the end edge of the heat insulator 130 slides on the accommodating tube 84, a load applied to the accommodating tube 84 can be dispersed in the axial direction. Thus, as compared to the case where a load is locally concentrated, it is possible to suppress damage to the accommodating tube 84.

Figure 7:
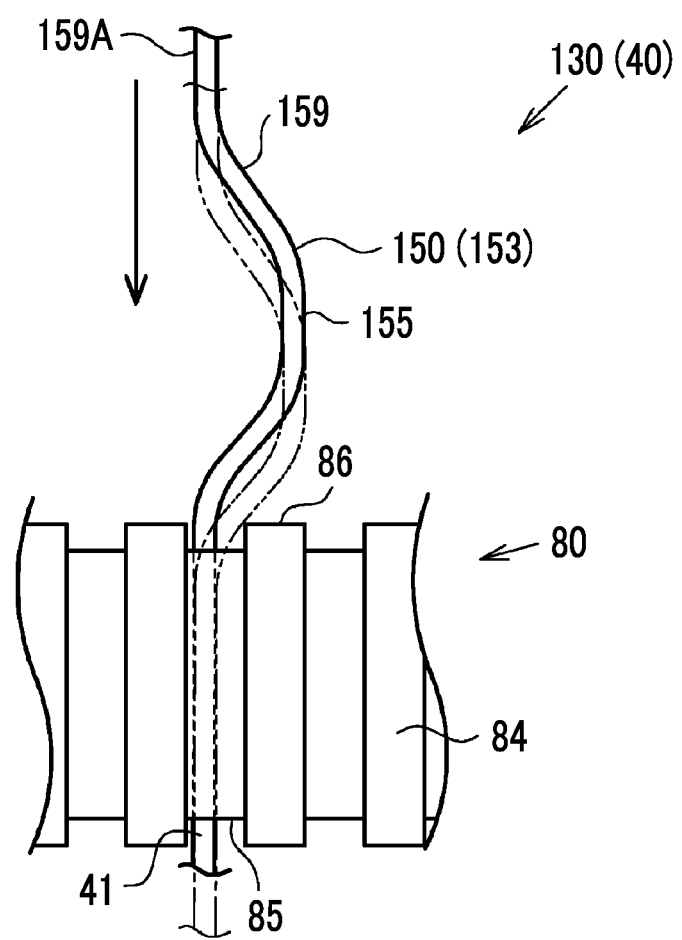
FIG. 7 is a side view that illustrates another manner m which the heat insulator slides on the wire harness in the second embodiment.

(5) The wire harness 80 may interfere with a part of the left end portion of the heat insulator 130, the part being located above or below the positions where the protruding portions 150 are provided. The accommodating tube 84 of the wire harness 80 may interfere with a part of the left end portion of the heat insulator 130, the part being located below the positions where the protruding portions 150 are provided as shown in FIG. 7. In this case, the upper facing wall 41 may slide on the small-diameter portion 85 of the accommodating tube 84. In the end edge of the heat insulator 130, the distances T11, T12, and T13 in the plate thickness direction between the outer end feces 158A and 159A of the recessed portions 158 and 159 and the distal end feces 155, 156, and 157 of the protruding, portions 150 are longer than the length L6 between the adjacent large-diameter portions 86 of the accommodating tube 84. In other words, each of the distances T11, T12, and T13, i.e., the height of the protruding and recessed portions in the end edge of the heat insulator 130 is longer than the length L6 of the small-diameter portions 85 in the axial direction of the accommodating tube 84. Thus, when the end edge of the heat insulator 130 slides on the small-diameter portion 85 of the accommodating tube 84 and their relative positions are changed as indicated by an arrow in FIG. 7, the large-diameter portion 86 of the accommodating tube 84 contacts (engages with) the protruding portion 150 of the end edge of the heat insulator 130 as indicated by alternate long and two short dashes lines in FIG. 7. Then, the contact area between the accommodating tube 84 and the heat insulator 130 increases and sliding movement thereof is suppressed. As a result, the area in which a load is applied on the accommodating tube 84 can be dispersed in the axial direction, and the sliding distance (the distance by which the end edge slides) in one place on the wire harness 80 can be shortened. Thus, it is possible to further suppress damage to the accommodating tube 84 of the wire harness 80.

(6) Further, the protruding and recessed portions of the end edge of the heat insulator 130 slide on the accommodating tube 84 as shown in FIG. 7, even if the accommodating tube 84 and the heat insulator 130 are brought to a state where the accommodating tube 84 and the heat insulator 130 are disengaged from each other, from a state where the accommodating tube 84 and the heat insulator 130 are engaged with each other as indicated by the alternate long and two short dashes lines in FIG. 7. Thus, the load applied to the accommodating tube 84 can be dispersed in the axial direction, and damage to the accommodating tube 84 can be suppressed.

Each of the above embodiments may be modified as described below. In the first embodiment, the shape of each protruding portion 50 may be appropriately changed. In this case, the distances (T1, T2, and T3) in the plate thickness direction in the protruding portions 50 may be set individually. For example, the distance T1 in the plate thickness direction in the first protruding portion 51 may be set to be different from the distance T2 in the plate thickness direction in the second protruding portion 52 or the distance T3 in the plate thickness direction in the third protruding portion 53. At least one of the distances T1, T2, and T3 may be shorter than the length L6 of the small-diameter portion 85 in the axial direction or may be equal to the length L6. Even in the case where the distances T1, T2, and T3 are all shorter than the length L6 of the small-diameter portion 85 in the axial direction, the position where the end edge slides on the wire harness 80 can be changed in the plate thickness direction at a time when the heat insulator 30 and the wire harness 80 interfere with each other, as long as the end edge of the heat insulator 30 has a shape that is protruding and recessed in the plate thickness direction in the side view of the end edge. Thus, as compared to a configuration in which the end edge of the heat insulator 30 is formed to be linear (straight) in the side view thereof, the sliding position can be dispersed. As a result, the same effect as described in above (1) can be obtained.

The lengths (L3, L4, and L5) in the perpendicular direction in the protruding portions 50 may be set individually. For example, the length L3 in the perpendicular direction in the first protruding portion 51 may be set to be different from the length L4 in the perpendicular direction in the second protruding portion 52 or the length L5 in the perpendicular direction in the third protruding portion 53. At least one of the lengths L3, L4, and L5 may be shorter than the diameter D1 of the small-diameter portion 85 or may be equal to the diameter D1.

In the first embodiment, the shape of each of the recessed portions 58 and 59 may be appropriately changed. In this ease, the lengths (L1 and L2) in the perpendicular direction in the recessed portions 58 and 59 may be set individually For example, at least one of the length L1 in the perpendicular direction in the first recessed portion 58 and the length L2 in the perpendicular direction in the second recessed portion 59 may be shorter than the diameter D1 of the small-diameter portion 85 or may be equal to the diameter D1.

In the second embodiment, the shape of each protruding portion 150 may be appropriately changed. In this case, the distances (T11, T12, and T13) in the plate thickness direction in the protruding portions 150 may be set individually. For example, the distance T11 in the plate thickness direction in the 11th protruding portion 151 maybe set to be different from the distance T12 in the plate thickness direction in the 12th protruding portion 152 or the distance T13 in the plate thickness direction in the 13th protruding portion 153. At least one of the distances T11, T12, and T13 may be shorter than the length L6 of the small-diameter portion 85 in the axial direction or may be equal to the length L6. Even in the case where the distances T11, T12, and T13 are all shorter than the length L6 of the small-diameter portion 85 in the axial direction, the end edge of the heat insulator 130 has a shape that is protruding and recessed in the plate thickness direction in the side view of the end edge. With this configuration, the position where the end edge slides on the wire harness 80 can be changed in the plate thickness direction when the heat insulator 130 and the wire harness 80 interfere With each other. Thus, as compared to a configuration in which the end edge of the heat insulator 130 is formed to be linear (straight) in the side view thereof, the sliding position can be dispersed. As a result, the same effect as described in above (1) can be obtained.

The lengths (L13, L14, and L15) in the perpendicular direction in the protruding portions 150 may be set individually. For example, the length L13 in the perpendicular direction in the 11th protruding portion 151 may be set to be different from the length L14 in the perpendicular direction in the 12th protruding portion 152 or the length L15 in the perpendicular direction in the 13th protruding portion 153. At least one of the lengths L13, L14, and L15 may be shorter than the diameter D1 of the small-diameter portion 85 or may be equal to the diameter D1.

In the second embodiment, the shape of each of the recessed portions 158 and 159 may be appropriately changed. In this case, the lengths (L11 and L12) in the perpendicular direction in the recessed portions 158 and 159 may be set individually. For example, at least one of the length L11 in the perpendicular direction in the 11th recessed portion 158 and the length L12 in the perpendicular direction in the 12th recessed portion 159 may be shorter than the diameter D1 of the small-diameter portion 85 or may be equal to the diameter D1.

The inclination angle of each of the inclined walls 51A, 51C, 52A, 52C, 53A, and 53C of the protruding portions 50 with respect to the upper facing wall 41 may be appropriately changed. For example, the inclined walls 51A, 51C, 52A, 52C, 53A, and 53C may be provided to extend in the plate thickness direction, that is, to extend perpendicularly to the upper facing wall 41.

The inclination angle of each of the inclined walls 151A, 151C, 152A, 152C, 153A, and 153C of the protruding portions 150 with respect to the upper facing wall 41 may be appropriately changed. For example, the inclined walls 151A, 151C, 152A, 152C, 153A, and 153C may be provided to extend in the plate thickness direction, that is, to extend perpendicularly to the upper facing wall 41.

In each of the above embodiments, the heat insulator 30 or 130 is provided with the three protruding portions 50 or 150. However, the number of the protruding portions is not limited to three. For example, only one protruding portion 50 or 150 may be provided, or four or more protruding portions 50 or 150 may be provided.

The protruding portions 50 or 150 may be provided only in a part of the left end portion of the heat insulator 30 or 130. The portion in which at least one protruding portion 50 or 150 is provided is not limited to the left end portion of the heat insulator 30 or 130. For example, when the wire harness 80 is routed above the heat Insulator 30 or 130, the protruding portions(s) 50 or 150 may be provided in an upper end portion of the upper cover portion 40. When the wire harness 80 is routed along a right side of the heat insulator 30 or 130, the protruding portion(s) 50 or 150 may be provided in a right end portion, of the upper cover portion 40. Alternatively, the protruding portion(s) 50 or 150 may be provided in the lower cover portion 60 of the heat insulator 30 or 130. In the heat insulator 30 or 130, the protruding and recessed portions may be continuously provided along the entire periphery thereof from an end edge of the upper cover portion 40 to an end edge of the lower cover portion 60. Even with each of the above-described configurations, an end edge among end edges of the heat insulator 30 or 130 has a shape that is protruding and recessed in the plate thickness direction in the side view of the end edge, the end edge being located on the side of the wire harness 80.

The accommodating tube 84 of the wire harness 80 does not necessarily need to have a bellows shape. For example, an accommodating tube 84 may be a cylindrical tube, or a rectangular or square tube.

What is claimed is:

1. A vehicle comprising:
   a heat Insulator in a form of a plate, the heat insulator covering an exhaust component of an internal combustion engine; and
   a wire harness disposed on a side of the heat insulator, wherein
   an end edge among end edges of the heat insulator has a shape that is protruding and recessed in a plate thickness direction in a side view of the end edge, the end edge being located on a side of the wire harness.

2. The vehicle according to claim 1, wherein:
   the wire harness includes an assemblage in which a plurality of electric cables is bundled and an accommodating tube in which the assemblage extends;
   the accommodating tube has a bellows shape in which small-diameter portions and large-diameter portions are alternately arranged; and
   in the end edge of the heat insulator, the end edge being located on the side of the wire harness, a distance in the plate thickness direction between an outer end face of a recessed portion of the end edge in the plate thickness direction and a distal end face of a protruding portion of the end edge in a direction in which the protruding portion protrudes is longer than a length between the large-diameter portions adjacent to each other in the accommodating tube.

3. The vehicle according to claim 1, wherein:

the wire harness includes an assemblage in which a plurality of electric cables is bundled and an accommodating tube in which the assemblage extends;

the accommodating tube has a bellows shape in which small-diameter portions and large-diameter portions are alternately arranged; and in the end edge of the heat insulator, the end edge being located on the side of the wire harness, a length, in a direction perpendicular to the plate thickness direction, of an outer end face of a recessed portion of the end edge in the plate thickness direction and a length, in the direction perpendicular to the plate thickness direction, of a distal end face of a protruding portion of the end edge in a direction in which the protruding portion protrudes are shorter than a diameter of each of the small-diameter portions of the accommodating tube in the side view.

4. The vehicle according to claim 2, wherein:

in the end edge located on the side of the wire harness, a length, in a direction perpendicular to the plate thickness direction, of the outer end face of the recessed portion and a length, in the direction perpendicular to the plate thickness direction, of the distal end face of the protruding portion are shorter than a diameter of each of the small-diameter portions of the accommodating tube in the side view.

* * * * *

UNITED STATES PATENT AND TRADEMARK OFFICE
CERTIFICATE OF CORRECTION

PATENT NO. : 10,232,805 B2
APPLICATION NO. : 15/793559
DATED : March 19, 2019
INVENTOR(S) : Hitoshi Nakao It is certified that error appears in the above-identified patent and that said Letters Patent is hereby corrected as shown below:

In the Specification

In Column 1, Line 22, delete "plat(c)" and insert --plate--, therefor.

In Column 2, Line 39, delete "Between" and insert --between--, therefor.

In Column 2, Line 39, after "insulator", delete "arid" and insert --and--, therefor.

In Column 2, Line 53, before "thickness", delete ".".

In Column 2, Line 55, after "direction", delete "m" and insert --in--, therefor.

In Column 3, Line 2, delete "pro trading" and insert --protruding--, therefor.

In Column 3, Line 4, after "connects", delete ",".

In Column 3, Line 41, after "manner", delete "m" and insert --in--, therefor.

In Column 3, Line 66, delete "coyer" and insert --cover--, therefor.

In Column 4, Line 11, after "21", delete "oi" and insert --of--, therefor.

In Column 4, Line 64, after "wall 41", delete "." and insert --,--, therefor.

In Column 5, Line 41, delete "thud" and insert --third--, therefor.

In Column 5, Line 47, after "upper", delete "lacing" and insert --facing--, therefor.

In Column 5, Line 58, delete "pro trading" and insert --protruding--, therefor.

Signed and Sealed this
Thirtieth Day of April, 2019

Andrei Iancu
*Director of the United States Patent and Trademark Office*

CERTIFICATE OF CORRECTION (continued)
U.S. Pat. No. 10,232,805 B2

In Column 5, Line 60, delete "tar" and insert --far--, therefor.

In Column 6, Line 15, delete "plats" and insert --plate--, therefor.

In Column 6, Line 53, delete "to ward" and insert --toward--, therefor.

In Column 6, Line 57, delete "heat insulator 39" and insert --heat insulator 30--, therefor.

In Column 7, Line 29, delete "tribe" and insert --tube--, therefor.

In Column 7, Line 66, after "other", delete "m" and insert --in--, therefor.

In Column 8, Line 9, before "insulator", delete "heal" and insert --heat--, therefor.

In Column 8, Line 55, after "150", delete "are-" and insert --are--, therefor.

In Column 9, Line 53, delete "132th" and insert --112th--, therefor.

In Column 10, Line 6, after "direction", delete ",".

In Column 10, Line 26, delete "In the 13forms a distal end face 157 of the 13th protruding portion 153." and insert --In the 13th protruding portion 153, an end face of the 13th distal end wall 153B on the far side forms a distal end face 157 of the 13th protruding portion 153.--, therefor.

In Column 10, Line 28 & 29, after "thickness", delete ",".

In Column 10, Line 55, after "upper", delete "lacing" and insert --facing--, therefor.

In Column 11, Line 25, before "that", delete "feces" and insert --faces--, therefor.

In Column 11, Line 27, after "protruding", delete ",".

In Column 11, Line 47, after "end", delete "feces" and insert --faces--, therefor.

In Column 11, Line 53, after "alternate", delete ",".

In Column 12, Line 4, after "end", delete "feces" and insert --faces--, therefor.

In Column 12, Line 5, after "end", delete "feces" and insert --faces--, therefor.

In Column 12, Line 6, after "protruding", delete ",".

In Column 13, Line 41, delete "With" and insert --with--, therefor.

In Column 14, Line 29, after "end portion", delete ",".